US005192923A

United States Patent [19]

Komatsu

[11] Patent Number: 5,192,923
[45] Date of Patent: Mar. 9, 1993

[54] ROTARY COUPLER

[75] Inventor: Yasutoshi Komatsu, Kanagawa, Japan

[73] Assignee: Sony Corporation, Tokyo, Japan

[21] Appl. No.: 714,015

[22] Filed: Jun. 12, 1991

[30] Foreign Application Priority Data

Jun. 13, 1990 [JP] Japan .................................. 2-152584

[51] Int. Cl.[5] .......................... H01P 1/06; G11B 21/00

[52] U.S. Cl. ...................................... 333/116; 333/261; 360/108

[58] Field of Search ............... 333/111, 116, 246, 257, 333/261; 360/64, 108

[56] References Cited

U.S. PATENT DOCUMENTS 4,692,721 9/1987 Ito et al. .......................... 333/261 X
4,730,224 3/1988 Komatsu ............................... 360/64

FOREIGN PATENT DOCUMENTS 105903 5/1986 Japan .................................. 333/261
105905 5/1986 Japan .................................. 333/261
30202 1/1990 Japan .................................. 333/261

*Primary Examiner*—Paul Gensler
*Attorney, Agent, or Firm*—Hill, Steadman & Simpson

[57] ABSTRACT

Reception and transmission of radio frequency signals is performed between the rotary portion and the stationary portion via an electromagnetically coupled portion in which a microstrip formed along substantial one lap of the circumference having a length equivalent to an odd multiple of substantially ½ of the electrical wave length of the transmitted radio frequency signal is electromagnetically coupled with a microstrip having a length equivalent to an add multiple of substantially ¼ of the electrical wave length of the radio frequency signal.

6 Claims, 3 Drawing Sheets

ROTARY COUPLER

FIELD OF THE INVENTION

The present invention relates to a rotary coupler in which reception and transmission of radio frequency signals is performed between rotary and stationary portions by an electromagnetic coupling between first and second microstrips, which are provided on the rotary and stationary portions, respectively. The present invention is applied, for example, to a rotary magnetic head type video tape recorder and the like.

BACKGROUND OF THE INVENTION

Generally, rotary transformers have been widely used in rotary magnetic head type video tape recorders to achieve reception and transmission of recorded and reproduced video signals by a rotary magnetic head provided with a rotary drum. Conventionally, the rotary transformer which performs signal transmission by using electromagnetic coupling between coils has a narrow band in which signals can be transmitted due to influences of the inductances of coils and stray capacitance. The frequency limit was about 60 MHz.

Recently, rotary couplers have been demanded in which the frequency band of signals to be processed has been widened in association with the development of digital VTR, data recorder, high definition TV, etc.

The present applicant has previously proposed a microstrip line type rotary coupler which is capable of transmitting signals over a wide band by forming microstrip lines serving as a directional coupler on opposing faces of rotary and stationary portions as is disclosed by, for example, Japanese Examined Patent Publication No. 64-9763.

The rotary coupler, the basic structure of which is disclosed in the Japanese Examined Patent Publication No. 64-9763, includes a rotary portion rotatable around the center of a first circumference, having a first microstrip line which is formed by a first microstrip disposed along the first circumference and an electrically conductive layer disposed in parallel with the first microstrip via a dielectric material layer and is terminated by a non-reflecting terminating resistor at one end thereof, a stationary portion having a second microstrip line which is formed by a second microstrip disposed along a second circumference around said center of rotation so that the second microstrip faces and is close to said first microstrip and formed by an electrically conductive layer disposed in parallel with said second microstrip via a dielectric material layer, said second microstrip line being terminated by a non-reflecting resistor at one end thereof, an input circuit connected with the other end of one of said first and second microstrips for inputting radio frequency signals thereto and an output circuit connected with the other end of the other one of said first and second microstrip lines for picking up the radio frequency signals inputted by said input circuit. The length of an electromagnetically coupled portion, by which said first microstrip is electromagnetically coupled with said second microstrip, is a multiple of an odd number of substantially ¼ of the electrical wave length of the radio frequency signal which propagates through the electromagnetically coupled portion, whereby reception and transmission of the radio frequency signals is performed between said rotary and stationary portions by the electromagnetic coupling between the first and second microstrips.

If a structure in which an end of the microstrip line is terminated by an non-reflecting resistor is adopted in such a microstrip line type rotary coupler, the microstrip line would not become a closed loop. Accordingly, a continuous signal transmission cannot be performed, resulting in changes in amplitude due to rotation of the rotary portion.

Therefore, the present applicant has proposed as a rotary coupler in which an improvement for reducing the changes in amplitude due to rotation of the rotary portion is achieved, a rotary coupler in which one of microstrip lines is formed along substantially one lap of the circumference having a circumferential length equivalent to a multiple of an integer of the central frequency of a transmission frequency band as is disclosed in the Japanese Examined Patent Publication No. 61-105903, a rotary coupler in which at least either one of microstrip lines on the side of a rotary portion or a stationary portion is divided into a plurality of sections, formed along the substantial entire circumference of the rotary coupler, as is disclosed in Japanese Unexamined Patent Publication No. 63-220401, and a rotary coupler in which one of microstrip lines is formed along the circumference of the rotary coupler having a circumferential length equivalent to a multiple of an integer of the central frequency of a transmission frequency band in electrical length and is bent at both ends, and is extended, and is provided with a connecting end and a non-reflecting terminating resistor on positions external to the circumference, as is disclosed in Japanese Unexamined Patent Publication No. 2-30202.

However, the various rotary couplers which are improved for reducing the changes in amplitude of transmission characteristics due to rotation of the above-mentioned rotary portion have problems in that a high precision is required for a pattern of the microstrips and that the pattern of the microstrips or the structure of external circuit, etc becomes complicated.

In the previously proposed various rotary couplers, one of the microstrip lines is formed along substantially one lap of the circumference of the rotary coupler having a circumferential length equivalent to a multiple of an integer of the electrical wave length of the transmitting radio frequency signal. It has been found from experiments seeking improvement in reducing the changes in amplitude in transmission characteristics due to rotation of the rotary portion that the changes in amplitude will become very low by forming one of the microstrips along substantially one lap of the circumference having a circumferential length equivalent to substantially ½ of the electrical wave length of the transmission radio frequency signal.

SUMMARY OF THE INVENTION

Hence, the present invention provides a microstrip line type rotary coupler adopting a structure in which one end of a microstrip line is terminated by a non-reflecting terminating resistor, in which stable transmission characteristics having less change in amplitude due to rotation of a rotary portion can be obtained by a simple structure in which a microstrip is formed along substantially one lap of the circumference having a circumferential length equivalent to a multiple of an odd number of substantially ½ of the electrical wave length of the transmission radio frequency signal.

The present invention provides a rotary coupler including a rotary portion rotatable around the center of a first circumference, having a first microstrip line which is formed by a first microstrip disposed along the first circumference and an electrically conductive layer disposed in parallel with the first microstrip via a dielectric material layer and is terminated by a non-reflecting terminating resistor at one end thereof, a stationary portion having a second microstrip line which is formed by a second microstrip disposed along a second circumference around said center of rotation so that the second microstrip faces and is close to said first microstrip and formed by an electrically conductive layer disposed in parallel with said second microstrip via a dielectric material layer, said second microstrip line being terminated by a non-reflecting resistor at one end thereof, an input circuit connected with the other end of one of said first and second microstrips for inputting radio frequency signals thereto and an output circuit connected with the other end of the other one of said first and second microstrip lines for picking up the radio frequency signals inputted by said input circuit, characterized in that one microstrip of said first and second microstrip line is formed along substantially one lap of the circumference having a length equivalent to a multiple of an odd number of substantially ½ of the electrical wave length of said radio frequency signal and in that the length of an electromagnetically coupled portion in which said first microstrip is electromagnetically coupled with said second microstrip is a multiple of an odd number of substantially ¼ of the electrical wave length of the radio frequency signal which propagates through the electromagnetically coupled portion, whereby reception and transmission of the radio frequency signals is performed between said rotary and stationary portions by electromagnetic coupling between the first and second microstrips. Reception and transmission of radio frequency signals is performed between the rotary portion and the stationary portion via an electromagnetically coupled portion in which a microstrip formed along substantially one lap of the circumference having a length equivalent to a multiple of an odd number of the electrical wave length of substantially ½ of the transmitted radio frequency signal is electromagnetically coupled with a microstrip having a length of substantially ¼ of the electrical wave length of the radio frequency signal in the rotary coupler of the present invention.

DESCRIPTION OF THE EMBODIMENT

An embodiment of a rotary coupler of the present invention will be described with reference to drawings in detail.

Figure 1:
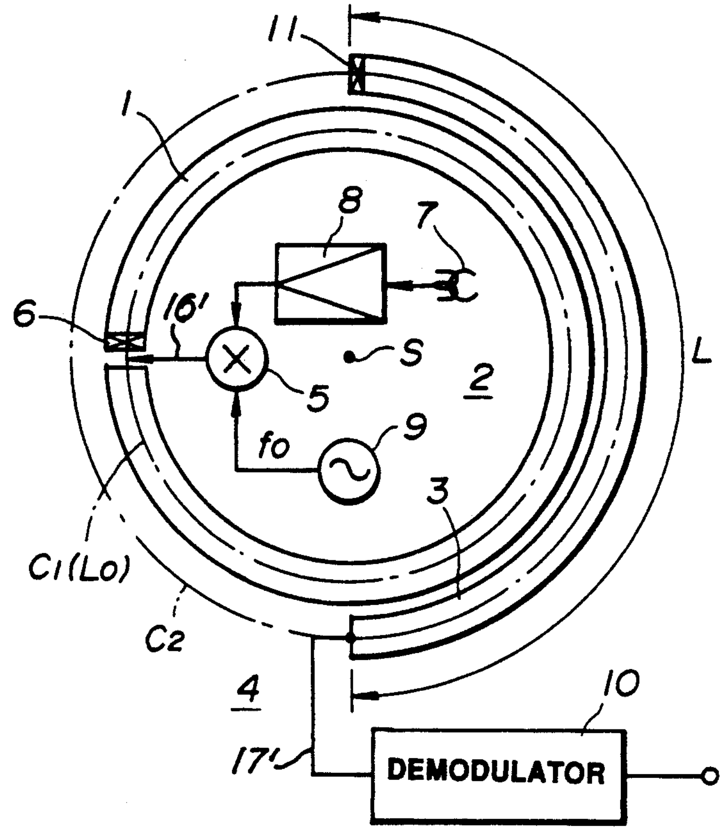
FIG. 1 is a view schematically illustrating the structure of a rotary coupler of the present invention which is applied for a rotary magnetic head device of a video tape recorder.

FIG. 1 shows a rotary coupler of the present invention which is used in a rotary magnetic head of a video tape recorder. The rotary coupler shown in FIG. 1 has a center of rotation S which is the center of a first circumference of a circle $C_1$, and comprises a rotary portion 2 having a first microstrip line formed by a first microstrip 1 disposed along the circumference of the circle $C_1$, a stationary portion 4 having a second microstrip line formed by a second microstrip 3 disposed along a second circumference of a circle $C_2$ around the center of rotation S in a close and opposite relationship with the first microstrip 1.

The first microstrip 1 which is on the side of the rotary portion 2 is connected via line 16' with a modulator 5 at one end which serves as a signal input terminal and is terminated by a non-reflecting terminating resistor 6 at the other end thereof.

The modulator 5 is supplied with reproduced video signals via a reproducing amplifier 8 from a rotary magnetic head 7 and is supplied with a radio frequency signal having a frequency of, for example, about 10 GHz from a radio frequency oscillator 9. The modulator 5 is adapted to modulate the radio frequency signals with reproduced video signals to supply the signal input terminal of the first microstrip 1 with the modulated output signals.

The second microstrip 3 on the side of the stationary portion 4 is connected via line 17' with a demodulator 10 at one end thereof, which serves as a signal output terminal, and is terminated by a non-reflecting terminating resistor 11 at the other end thereof.

In the rotary coupler, the length $L_0$ of the first circumference $C_1$ is equivalent to ½ of the wave length $\lambda_0$ of the radio frequency signal in electrical length. The first microstrip 1 on the side of the rotary portion 2 is formed along substantially on lap of the first circumference $C_1$. The length L along which the microstrips 1 and 3 face with each other, that is, the length of the second microstrip 3 on the side of the stationary portion 2 is equivalent to ¼ of the wave length $\lambda_0$ of the radio frequency signal.

Figure 2:
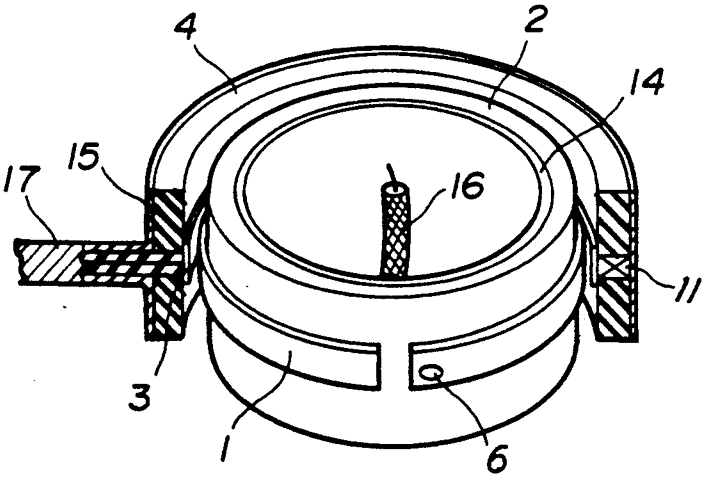
FIG. 2 is a, sectional in part, perspective graph of the rotary coupler.

The rotary portion 2 and the stationary portion 4 are made of dielectric material and are cylindrical in form as shown in FIG. 2. The rotary portion 2 is coated with an electrically conductive layer 14 over the entire of the inner periphery thereof and the stationary portion 4 is coated with an electrically conductive layer 15 over the entire of the outer periphery thereof. The first and second microstrips 1 and 3 are disposed on the peripheries of the rotary portion 2 and the stationary portion 4, which face with each other so that the microstrips 1 and 3 face with each other. The first microstrip 1 on the side of the rotary portion 2 is spaced from the electrically conductive layer 14 via a dielectric layer made of dielectric material forming the rotary portion 2. The second microstrip on the side of the stationary or fixed portion 4 is spaced from the electrically conductive layer 15 via a dielectric layer made of dielectric material forming the stationary portion 4. Coaxial cables 16 and 17 are connected to the first and second microstrips 1 and 3, respectively at one end thereof as lead lines (corresponding to 16' and 17' of FIG. 1) for external connection. The coaxial cable 16 is connected through the dielectric material of the stationary portion 4 to the end of the first microstrip 1 which is remote from the terminating resistor 6.

Figure 3:
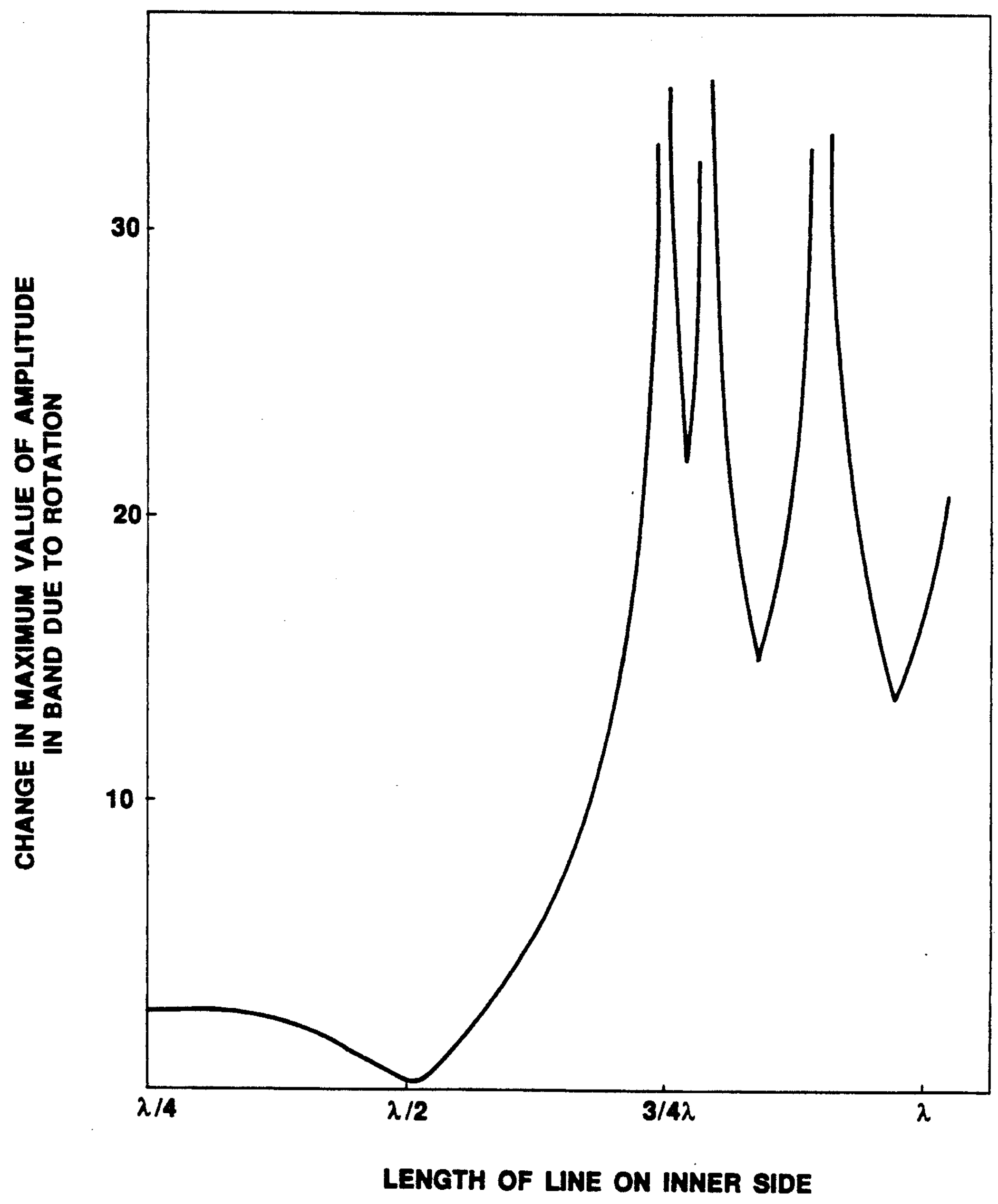
FIG. 3 is a characteristic view showing a result of measurement of a maximum value of the change in amplitude in the transmission band due to rotation of a rotary portion in the rotary coupler of the present invention.

In the thus formed rotary coupler, a modulated output signal which is generated by modulating the radio frequency signal with the reproduced video signal is supplied to the signal input terminal of the first microstrip 1 on the side of the rotary portion 2 from the modulator 5, the modulated output signal propagates toward the terminating end of the first microstrip 1 in one direction and a part of the modulated output signal propagates to the second microstrip 3 on the side of the stationary portion 4 which faces to the microstrip 1 and is demodulated by the demodulator 10. The signal which has propagated from the first microstrip 1 to the second strip 3 propagates toward the terminating end of the first microstrip 1 in one direction and is absorbed by the non-reflecting terminating resistor 6. A maximum value of the change in amplitude in a transmission band due to rotation of the rotary portion 2 was measured by fixing the length L of the electromagnetically coupling portion in which the microstrips 1 and 3 face with each other, that is, the length of the second microstrip 3 on the side of the stationary portion 4, to ¼ of the wave length $\lambda_0$ of the radio frequency signal in electrical length and by changing the length of the first microstrip 1 on the side of the rotary portion 2, that is, the length of the first circumference $C_1$, to a value approximately equal to $\lambda_0/2A$. The measurement (shown in FIG. 3) shows that the value of the change became minimum when the length $L_0$ of the first circumference $C_1$ was preset about ½ of the wave length $\lambda_0$ of the radio frequency signal, and that the change in amplitude was minimum when the ratio of the length $L_0$ of the first circumference $C_1$ to the length L of the electromagnetically coupled portion is 2:1 and that the change in amplitude at a central frequency in a transmission band could be suppressed to a value not higher than 3 dB in the range of 1.6: 1 to 2.3: 1.

Although the changes in amplitude due to rotation of the rotary portion 2, which is a transmission characteristic depends upon the width of each microstrip 1 or 3 and the spacing therebetween, it became minimum when the ratio of $L_0$ to L was substantially 2:1.

A stable transmission characteristic having less change in amplitude of the transmission signal due to rotation of the rotary portion can be obtained by a simple structure by performing reception and transmission of a radio frequency signal between the rotary portion and the stationary portion via an electromagnetically coupled portion in which a microstrip, formed along substantially one lap of the circumference having a length equivalent to an odd multiple of ½ of the electrical wave length of the transmitted radio frequency signal, is electromagnetically coupled with a microstrip having a length of substantially ¼ of the electrical wave length of the radio frequency signal in the rotary coupler of the present invention.

Figure 4:
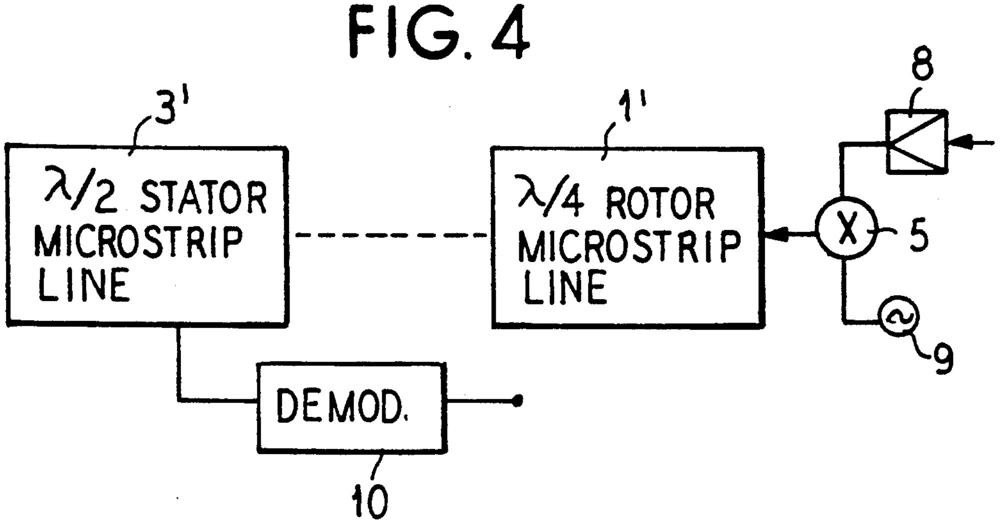
FIG. 4 is a diagrammatic illustration of an alternative embodiment of the present invention.

FIG. 4 shows a diagrammatical illustration of an embodiment of the invention which the rotor microstrip line 1' is one-quarter wavelength in length, and the stator microstrip line 3' is one-half wavelength in length. The other components are the same as illustrated in FIG. 1.

What is claimed is:

1. A rotary coupler, comprising:

an input circuit for inputting radio frequency signals;

an output circuit for picking up the radio frequency signals inputted by said input circuit;

a rotary portion including a first microstrip formed along substantially one lap of a first circumference of a circle having a circumferential length equivalent to a multiple of an odd number of substantially ½ of the electrical wave length of the radio frequency signal inputted by said input circuit, comprising a first microstrip line having one end connected with said input circuit and the other end terminated by a non-reflecting resistor and an electrically conductive layer which is disposed in parallel with said first microstrip via a layer made of a dielectric material, said rotary portion being rotatable around the center of said first circumference of the circle; and a stationary portion including a second microstrip which is formed along a length equivalent to a multiple of an odd number of substantially ¼ of the electrical wave length of the radio frequency signal inputted by said input circuit and is disposed along a second circumference around said center of rotation in such a position that it faces and is close to said first microstrip to be electromagnetically coupled with said first microstrip and an electrically conductive layer provided in parallel with said second microstrip via a layer made of a dielectric material, said second microstrip comprising a second microstrip line having one end connected with said output circuit and the other end terminated by a non-reflecting resistor.

2. A rotary coupler, comprising:

an input circuit for inputting radio frequency signals;

an output circuit for picking up the radio frequency signals inputted by said input circuit;

a stationary portion including a first microstrip formed along substantially one lap of a first circumference of a circle having a circumferential length equivalent to a multiple of an odd number of substantially ½ of the electrical wave length of the radio frequency signal inputted by said input circuit, comprising a first microstrip line having one end connected with said input circuit and the other end terminated by a non-reflecting resistor and an electrically conductive layer which is disposed in parallel with said first microstrip via a layer made of a dielectric material, and a rotary portion including a second microstrip which is formed along a length equivalent to a multiple of an odd number of substantially ¼ of the electrical wave length of the radio frequency signal inputted by said input circuit and is disposed along a second circumference around a center of rotation in such a position that it faces and is close to said first microstrip to be electromagnetically coupled with said first microstrip and an electrically conductive layer provided in parallel with said second microstrip via a layer made of a dielectric material, said second microstrip comprising a second microstrip line having one end connected with said output circuit and the other end terminated by a non-reflecting resistor, said rotary portion being rotatable around the center of said second circumference.

3. A rotary coupler, comprising:

an input circuit for inputting radio frequency signals;

an output circuit for picking up the radio frequency signals inputted by said input circuit;

a rotary portion including a first microstrip formed along substantially one lap of a first circumference of a circle having a circumferential length equivalent to a multiple of an odd number of substantially ½ of the electrical wave length of the radio frequency signal inputted by said input circuit, comprising a first microstrip line having one end connected with said output circuit and the other end terminated by a non-reflecting resistor and an electrically conductive layer which is disposed in parallel with said first microstrip via a layer made of a dielectric material, said rotary portion being rotatable around the center of said first circumference; and a stationary portion including a second microstrip which is formed along a length equivalent to a multiple of an odd number of substantially ½ of the electrical wave length of the radio frequency signal inputted by said input circuit and is disposed along a second circumference around said center of rotation on such a position that it faces and is close to said first microstrip to be electromagnetically coupled with said first microstrip and an electrically conductive layer provided in parallel with said second microstrip via a layer made of a dielectric material, said second microstrip comprising a second microstrip line having one end connected with said input circuit and the other end terminated by a non-reflecting resistor.

4. A rotary coupler, comprising:

an input circuit for inputting radio frequency signals;

an output circuit for picking up the radio frequency signals inputted by said input circuit;

a stationary portion including a first microstrip formed along substantially one lap of a first circumference of a circle having a circumferential length equivalent to a multiple of an odd number of substantially ½ of the electrical wave length of the radio frequency signal inputted by said input circuit, comprising a microstrip line having one end connected with said output circuit and the other end terminated by a non-reflecting resistor and an electrically conductive layer which is disposed in parallel with said first microstrip via a layer made of a dielectric material; and a rotary portion including a second microstrip which is formed along a length equivalent to a multiple of an odd number of substantially ½ of the electrical wave length of the radio frequency signal inputted by said input circuit and is disposed along a second circumference around a center of rotation on such a position that it faces and is close to said first microstrip to be electromagnetically coupled with said first microstrip and an electrically conductive layer provided in parallel with said second microstrip via a layer made of a dielectric material, said second microstrip comprising a second microstrip line having one end connected with said input circuit and the other end terminated by a non-reflecting resistor, said rotary, portion being rotatable around the center of second circumference of the circle.

5. A rotary coupler as defined in any one of claims 1 to 4 in which said input circuit comprises a modulator which modulates radio frequency signals with video signals for outputting the modulated signals.

6. A rotary coupler as defined in claim 5 in which said modulator modulates radio frequency signals of about 10 GHz with video signals for outputting the modulated signals.

* * * * *